United States Patent Office 3,017,767
Patented Jan. 23, 1962

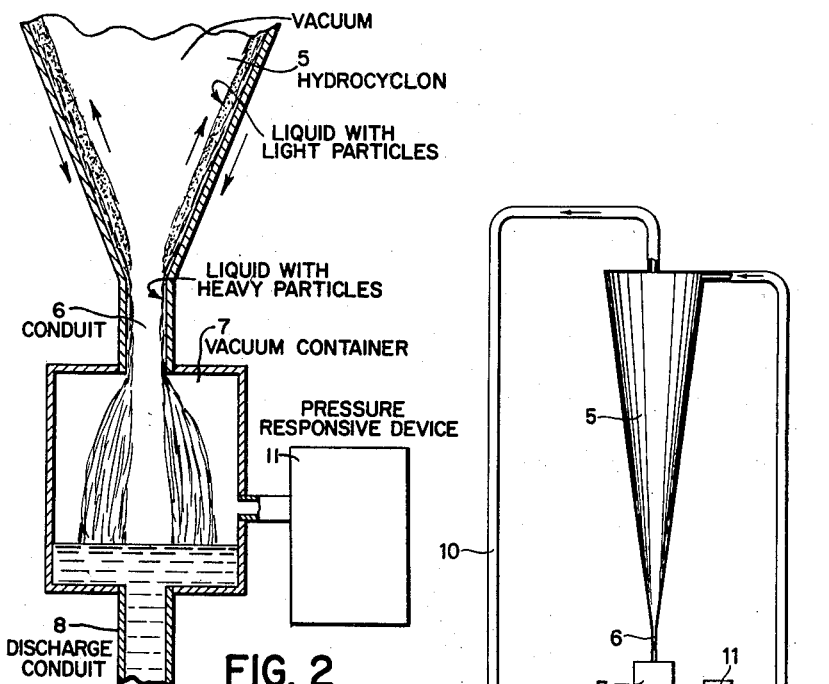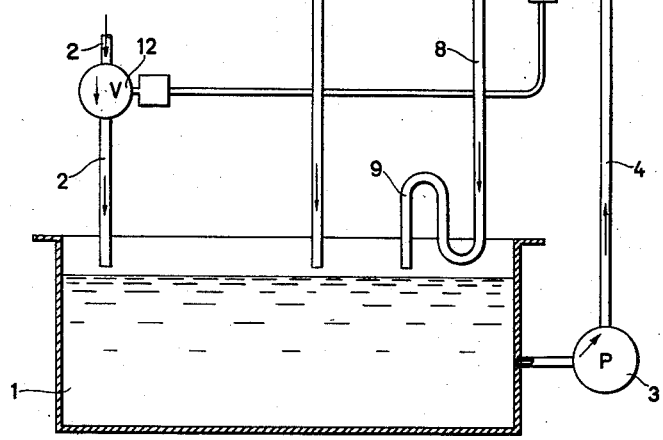
FIG. 2
FIG. 1
INVENTOR
Karl E. Mossberg
BY
ATTORNEY

3,017,767
AUTOMATIC CONTROL OF THE CONCENTRATION IN SUSPENSIONS SUCH AS CELLULOSE, PAPER PULP, AND THE LIKE
Karl Evert Mossberg, Johanneshov, Sweden, assignor to Aktiebolaget Calor & Sjögren, Stockholm, Sweden
Filed Dec. 4, 1957, Ser. No. 700,691
Claims priority, application Sweden Dec. 6, 1956
3 Claims. (Cl. 73—54)

The present invention relates to a device for automatically controlling the concentration in suspensions such as cellulose suspension, paper pulp, and the like.

The device according to the invention comprises a container or reservoir for the respective suspension which container has connected thereto conduit means for conveying a diluting liquid. The said container communicates with the suction side of a pump, the pressure side of which is connected through a feeding conduit with a hydrocyclone of any standard design. The liquid receiving chamber of the hydrocyclone preferably has the shape of an inverted cone and has its lower end connected with a vacuum or low pressure chamber which is in communication with said container for the suspension through the intervention of conduit means the lower end of which is designed as a water lock. The upper end of the hydrocyclone is in direct communication through a return conduit with the suspension container. The inner space of the low pressure chamber communicates with a pressure responsive device of common type adapted to convey impulses to a valve interposed in the first named conduit means that conveys the diluting liquid, and thereby to control the flow of the diluting liquid therethrough.

The problem underlying the present invention consists in adjusting the concentration of a suspension to a predetermined desired value. This is effected by means of changes in the pressure occurring in the low pressure chamber when a suspension having a higher or lower concentration than the desired value enters the hydrocyclone. It has been proved that this change in pressure in the low pressure chamber occurs at a ratio inversely proportional to the concentration of the suspension. In other words a higher concentration brings about a lower pressure in the low pressure chamber than would be brought about by a lower concentration. This change in pressure acts upon the pressure responsive device so that the latter conveys an impulse to a valve in the conduit means for the diluting liquid so that said valve will be adjusted for increased or decreased supply of diluting liquid to the suspension in said suspension container until the concentration has reached substantially the above mentioned predetermined desired value.

The invention will be explained in connection with the accompanying drawing.

FIG. 1 is a diagrammatic representation of a device according to the invention.

FIG. 2 is a view in cross section of the low pressure chamber shown in FIG. 1.

The device illustrated in FIG. 1 comprises a suspension container or reservoir 1 having connected thereto a conduit 2 for the diluting liquid. A conduit leads from the container 1 to the suction side of a pump 3 the pressure side of which communicates through a feeding conduit 4 with a tangentially arranged inlet opening at the upper part of a hydrocyclone 5 of cone-shaped type. The hydrocyclone 5 comprises a liquid receiving chamber having the shape of a hollow inverted cone. The lower end or apex of the hydrocyclone communicates through a conduit 6 which may be of variable cross section with a vacuum or low pressure chamber 7. The conduit 6 may, for instance, be provided by exchangeable nozzle pieces. The low pressure chamber 7 communicates with a discharge conduit 8 the lower end of which is designed as a water lock or intercepting trap 9 extending into the suspension container 1.

In FIG. 2, the action of the liquid material in the lower part of the hydrocyclone 5, and in the low pressure chamber 7, is shown in detail. The liquid, with heavy particles suspended therein, swirling about against the inner surface of the wall of the hydrocyclone 5 due to centrifugal forces is moving downward, while the liquid with lighter particles rises in counter-current direction to and inwardly of the liquid with heavier particles. The heavier liquid continues to move downwardly through conduit 6 and is discharged into low pressure chamber 7, while the lighter liquid continues to move upwardly until it reaches the centrally located opening in the top of the hydrocyclone and there enters return conduit 10.

Due to the swirling motion of the liquid in the interior of the hydrocyclone there will be, along the axis of rotation, a centrally located air core at sub-atmospheric pressure. This lowering of pressure is in proportion to the concentration of the suspension.

The heavier liquid enters, and descends through, the low pressure chamber to the discharge conduit 8 being conducted therein to container 1. It will be noted that the liquid fills conduit 8 forming a seal therein, but due to the rotary motion of the liquid emerging from the lower end of the hydrocyclone, the liquid does not fill and close conduit 6. The sub-atmospheric pressure in the interior of the hydrocyclone is thus transmitted directly and continuously to the interior of the low pressure chamber 7, and this pressure accordingly varies with and is an indication of the concentration of the suspension.

The upper end of the hydrocyclone 5 communicates directly through a return conduit 10 with the suspension container 1. In this way, a system is obtained which is closed with regard to the outside. In this system, the pressure changes produced by the hydrocyclone 5 act due to the variable suspension concentration upon a pressure response device 11 and comprises a device for automatic regulation of pressure, for example a common pressure gauge or an impulse element, communicating with the interior of the low pressure chamber 7. The impulses of said regulation device 11 are conveyed in an expedient manner to a diluting liquid admitting valve 12, for instance by electromagnetic or pneumatic means. The valve 12 controls the supply of diluting liquid to the suspension container 1.

The device according to the invention and illustrated in the drawing operates as follows:

The suspension in container 1 is by means of the pump 3 conveyed through conduit 4 and at high pressure is tangentially introduced into the cone-shaped interior of the hydrocyclone 5. The liquid will then be subjected to high centrifugal forces and is caused to perform a rapid circulatory and downwardly directed movement and, thereupon, will be caused to carry out a likewise circulatory but upwardly directed movement. These two simultaneously occurring movements are possible together inasmuch as the downwardly directed movement is effected along the interior wall of the hydrocyclone to the apex of the inverted cone where a fraction of the suspension passes through the conduit 6 while the upwardly directed movement of the remainder of the suspension is effected along the central axis of the interior of said hydrocyclone and forms a central ascending column. Depending on the angle of the cone of the interior of the hydrocyclone and on the cross-sectional area of the conduit 6 connected to the lower end of the inner chamber, a correspondingly larger or smaller fraction of liquid will pass through the conduit 6 into the low pressure chamber 7 and thence through the discharge conduit 8 and the trap 9 into the suspension container 1. The remaining portion of the liquid in the interior of the hydrocyclone returns through the outlet opening at the center of the upper closure of the hydrocyclone through the return conduit 10 directly into the suspension reservoir 1. In this connection, the pressure response device 11 is adjusted for a certain desired concentration of the suspension. Valve 12 will allow an average or mean quantity of diluting liquid to pass through conduit 2 into container 1. When the concentration of the suspension in container 1 increases, a decrease in pressure will result in the low pressure chamber 7 whereby the pressure response device 11 will be so affected that it conveys an impulse to the diluting liquid valve 12 which latter responsive thereto will be regulated to pass a greater quantity of diluting fluid so that the concentration of the suspension in container 1 will be reduced. If, however, the concentration decreases and drops below the desired value, a corresponding pressure will occur in the low pressure chamber 7 so that the pressure responsive means 11 will convey an impulse of such a kind to valve 12 as to regulate the latter for passing a lower quantity of diluting liquid therethrough. Consequently, the concentration of the suspension in container 1 will automatically be held substantially constant.

What I claim is:

1. In a device which is sensitive to variations in viscosity of a suspension consisting of a liquid and particles of varying weight therein, a hydrocyclone comprising an inverted hollow cone, a tangentially directed peripheral inlet adjacent the upper end of said hollow cone for the supply of suspension thereto under pressure so the suspension will take a rotary path in the hollow cone, a first outlet at the extreme lower end of the hollow cone for the discharge from the cone of liquid with heavy particles therein, a second outlet at the top of the hollow cone for the discharge from the cone of liquid with lighter particles therein, means defining a chamber of greater cross sectional area than said first outlet beneath the cone and connected to said first outlet to receive the discharge from the lower end of the cone, outlet means leading from the chamber of a smaller cross sectional area than the chamber, said outlet means being provided with liquid trap means so as to maintain a liquid seal in the outlet means, the rotating suspension in the hollow cone having a core region free of liquid and at sub-atmospheric pressure, and said first outlet being of large enough size to maintain the core region in the cone in direct uninterrupted communication with the said chamber whereby the pressure in the chamber will be indicative of the viscosity of the suspension.

2. A device according to claim 1 which includes pressure sensitive control means connected to said chamber so as to be influenced by the subatmospheric pressure therein.

3. In a device which is sensitive to variations in viscosity of a suspension consisting of a liquid and particles of varying weight therein, a hydrocyclone comprising an inverted hollow cone, a tangentially directed peripheral inlet adjacent the upper end of said hollow cone for the supply of suspension thereto under pressure so the suspension will take a rotary path in the hollow cone, a first outlet at the extreme lower end of the hollow cone for the discharge from the cone of liquid with heavy particles therein, a second outlet at the top of the hollow cone for the discharge from the cone of liquid with lighter particles therein, means defining a low pressure chamber of greater cross sectional area than said first outlet beneath the cone and connected to said first outlet to receive the discharge from the lower end of the cone, pressure sensitive control means connected to said chamber so as to be influenced by the low pressure therein, outlet means leading from the chamber of a smaller cross sectional area than the chamber, said outlet means being provided with liquid trap means so as to maintain a liquid seal in the outlet means, the rotating suspension in the hollow cone having a core region free of liquid and at sub-atmospheric pressure, and said first outlet being of large enough size to maintain the core region in the cone in direct uninterrupted communication with the said chamber whereby the pressure in the chamber will be indicative of the viscosity of the suspension.

References Cited in the file of this patent

UNITED STATES PATENTS

| | | |
|---|---|---|
| 2,233,561 | Kalle | Mar. 4, 1941 |
| 2,597,138 | Trigg | May 20, 1952 |
| 2,712,752 | Hage | July 12, 1955 |
| 2,716,337 | Fontein | Aug. 30, 1955 |
| 2,889,199 | Osborne et al. | June 2, 1959 |
| 2,897,972 | Cannon | Aug. 4, 1959 |